(12) United States Patent
Kikkawa (10) Patent No.: US 12,083,723 B2
(45) Date of Patent: Sep. 10, 2024

(54) METHOD FOR MANUFACTURING INTERDENTAL CLEANING TOOL

(71) Applicant: Kobayashi Pharmaceutical Co., Ltd., Osaka (JP)

(72) Inventor: Tasuku Kikkawa, Osaka (JP)

(73) Assignee: Kobayashi Pharmaceutical Co., Ltd., Osaka (JP)

( * ) Notice: Subject to any disclaimer, the term of this patent is extended or adjusted under 35 U.S.C. 154(b) by 440 days.

(21) Appl. No.: 17/418,437

(22) PCT Filed: Nov. 18, 2019

(86) PCT No.: PCT/JP2019/045068
§ 371 (c)(1),
(2) Date: Jun. 25, 2021

(87) PCT Pub. No.: WO2020/137253
PCT Pub. Date: Jul. 2, 2020

(65) Prior Publication Data
US 2022/0063155 A1 Mar. 3, 2022

(30) Foreign Application Priority Data
Dec. 28, 2018 (JP) ................. 2018-248343

(51) Int. Cl.
*B29C 45/16* (2006.01)
*A61C 15/02* (2006.01)
(52) U.S. Cl.
CPC .......... *B29C 45/1676* (2013.01); *A61C 15/02* (2013.01)
(58) Field of Classification Search
CPC ........ B29C 45/14491; B29C 45/14409; B29C 45/14385; B29C 45/162; B29C 45/1615; B29C 2045/1696
See application file for complete search history.

(56) References Cited

U.S. PATENT DOCUMENTS

| 5,775,346 A | 7/1998 | Szyszkowski |
| 6,085,761 A | 7/2000 | Inaba |

(Continued)

FOREIGN PATENT DOCUMENTS

| DE | 20 2006 019 175 U1 | 7/2007 |
| DE | 10 2016 005 012 A1 | 10/2017 |

(Continued)

OTHER PUBLICATIONS

International Search Report and Written Opinion for International Application No. PCT/JP2019/045068, mailed Feb. 4, 2020.

(Continued)

*Primary Examiner* — Emmanuel S Luk
(74) *Attorney, Agent, or Firm* — Wolf, Greenfield & Sacks, P.C.

(57) ABSTRACT

A method for manufacturing an interdental cleaning tool is provided that is capable of suppressing molding defects of the interdental cleaning tool. The method for manufacturing an interdental cleaning tool includes: a first step of injecting a base material into primary molds 40, 41 to mold a base material portion 10 including a base section 11 and a shaft section 12 extending from the base section 11; and a second step of injecting a soft material into secondary molds 50, 51, in which the base material portion 10 is placed, from a position corresponding to a middle part 12b of the shaft section 12 located further toward the proximal side than a distal end part 12a to mold a soft portion 20 including a covering section 21 that covers the distal end part 12a of the shaft section 12 and a plurality of projections 22 projecting from the covering section 21, and an extension soft portion 30 that covers the middle part 12b of the shaft section 12 so as to extend the covering section 21 toward the proximal side of the shaft section 12, the extension soft portion 30 not having the projections 22.

4 Claims, 7 Drawing Sheets

(56) References Cited

U.S. PATENT DOCUMENTS

| | | | |
|---|---|---|---|
| 6,158,444 | A | 12/2000 | Weihrauch |
| 10,195,005 | B2 | 2/2019 | Wallström et al. |
| 11,026,771 | B2 | 6/2021 | Kikkawa |
| 11,484,110 | B2 | 11/2022 | Butz et al. |
| 2009/0193603 | A1* | 8/2009 | Ponzini ............ B29C 45/14065 425/542 |
| 2009/0230756 | A1 | 9/2009 | Crossman |
| 2010/0024839 | A1 | 2/2010 | Kalbfeld et al. |
| 2010/0043165 | A1* | 2/2010 | Juentgen ................ A46B 3/02 15/159.1 |
| 2011/0226276 | A1* | 9/2011 | Limongi ............... A46D 3/045 132/218 |
| 2014/0008837 | A1 | 1/2014 | Eatherton |
| 2014/0123423 | A1* | 5/2014 | Morgott ................. A46B 3/22 15/167.1 |
| 2015/0114428 | A1* | 4/2015 | Kato ................ B29C 45/14073 264/243 |
| 2015/0257861 | A1 | 9/2015 | Dishon |
| 2015/0282601 | A1 | 10/2015 | Butz et al. |
| 2016/0058531 | A1 | 3/2016 | Adriano et al. |
| 2017/0319309 | A1 | 11/2017 | Gengyo et al. |
| 2017/0319310 | A1* | 11/2017 | Gengyo ............ A46B 15/0093 |
| 2019/0090623 | A1* | 3/2019 | Görich .................. A46B 3/005 |
| 2019/0289984 | A1* | 9/2019 | Fischer ............ B29C 45/14385 |
| 2019/0343608 | A1* | 11/2019 | Kikkawa ................ A61C 15/02 |
| 2020/0188071 | A1* | 6/2020 | Kikkawa ................ A61C 15/02 |
| 2020/0189159 | A1* | 6/2020 | Kikkawa .................. A46B 3/04 |
| 2020/0260853 | A1 | 8/2020 | Zwimpfer |
| 2020/0405462 | A1 | 12/2020 | Petersen |
| 2022/0047365 | A1 | 2/2022 | Kikkawa et al. |
| 2022/0087796 | A1 | 3/2022 | Kikkawa |

FOREIGN PATENT DOCUMENTS

| | | |
|---|---|---|
| JP | 2001-506514 A | 5/2001 |
| JP | D1421422 S | 8/2011 |
| JP | 2013-188299 A | 9/2013 |
| JP | 2013-192866 A | 9/2013 |
| JP | D1489187 S | 12/2013 |
| JP | D1492452 S | 2/2014 |
| JP | D1492453 S | 2/2014 |
| JP | D1492784 S | 2/2014 |
| JP | 2016-087362 A | 5/2016 |
| JP | 5929346 B2 | 6/2016 |
| JP | 2016-131602 A | 7/2016 |
| JP | 2017-000762 A | 1/2017 |
| JP | 2017-000775 A | 1/2017 |
| JP | 2017-000776 A | 1/2017 |
| JP | 2017-118959 A | 7/2017 |
| JP | 2017-136202 A | 8/2017 |
| JP | 6292246 B2 | 3/2018 |
| JP | 2018-140088 A | 9/2018 |
| JP | 2018-158004 A | 10/2018 |
| WO | WO 2013/176297 A1 | 11/2013 |
| WO | WO 2014/005659 A1 | 1/2014 |
| WO | WO 2014/054011 A1 | 4/2014 |
| WO | WO 2016/020029 A1 | 2/2016 |
| WO | WO 2016/076373 A1 | 5/2016 |
| WO | WO 2016/167191 A1 | 10/2016 |
| WO | WO 2018/124302 A1 | 7/2018 |
| WO | WO 2022/243505 A1 | 11/2022 |

OTHER PUBLICATIONS

Kikkawa et al., Interdental cleaning tool. Co-pending U.S. Appl. No. 17/418,373, filed Jun. 25, 2021.

Kikkawa et al., Interdental cleaning tool. Co-pending U.S. Appl. No. 18/463,481, filed Sep. 8, 2023.

Kikkawa, Interdental cleaning tool. Co-pending U.S. Appl. No. 17/418,435, filed Jun. 25, 2021.

Notice of Submission of Publications for Japanese Application No. 2018-248342, dated May 19, 2023.

Reason for Submission for Japanese Application No. 2018-248342, dated May 23, 2023.

[No Author Listed] 2011 Good Design Award, Silicone Rubber Interdental Brush. Japan Institute of Design Promotion. https://www.g-mark.org/en/gallery/winners/9d78119a-803d-11ed-862b-0242ac130002?years=2011. 2011:1-8.

[No Author Listed] Labeled drawings corresponding to JP D1421422 S: front view, bottom view, A-A cross-sectional view, C-C partially enlarged view, and reference perspective view. Aug. 22, 2011:1-4.

[No Author Listed] Dental Pro Silicone Rubber Interdental Brush (12 pieces). Yodobashi. https://www.yodobashi.com/product/100000001001664834/. Date first available Dec. 16, 2012:1-4.

[No Author Listed] Photographs showing dimensions of Dental Pro Silicone Rubber Interdental Brush (12 pieces). Photos undated; product first available Dec. 2012:1-2.

Notice of Submission of Information for Japanese Application No. 2018-248343, Appeal No. Fufuku 2023-19212, filed Dec. 7, 2023.

Reason for Submission for Japanese Application No. 2018-248343, Appeal No. Fufuku 2023-19212, filed Dec. 7, 2023.

[No Author Listed] Detailed drawings of JPD1489187S: copies of the front view, the plan view and the A-A' end view of JPD1489187S, with the name of each component, etc. being added. JPD1489187S issued Dec. 27, 2013. 1-6.

[No Author Listed] Detailed drawings of JPD1492452S: copies of the front view and the right side view of JPD1492452S, with the name of each component, etc. being added. JPD1492452S issued Feb. 14, 2014. 1-4.

[No Author Listed] Detailed drawings of JPD1492453S: copies of the front view and the right side view of JPD1492453S, with the name of each component, etc. being added. JPD1492453S issued Feb. 14, 2014. 1-4.

[No Author Listed] Detailed drawings of JPD1492784S: copies of the front view and the right side view of JPD1492784S, with the name of each component, etc. being added. JPD1492784S issued Feb. 14, 2014. 1-4.

* cited by examiner

METHOD FOR MANUFACTURING INTERDENTAL CLEANING TOOL

CROSS-REFERENCE TO RELATED APPLICATIONS

This Application is a national stage filing under 35 U.S.C. § 371 of International Patent Application Serial No. PCT/JP2019/045068, filed Nov. 18, 2019, which claims priority to Japanese application number 2018-248343, filed Dec. 28, 2018, each of which is herein incorporated by reference in its entirety.

TECHNICAL FIELD

The present invention relates to a method for manufacturing an interdental cleaning tool.

BACKGROUND ART

Conventionally, interdental cleaning tools for cleaning spaces between teeth are known. For example, Patent Documents 1 to 3 each disclose an interdental cleaning tool that includes a base material portion made of a synthetic resin and a soft portion made of an elastomer. The base material portion includes a flat handle section, which serves as a handle, and an elongated core base material section, which extends from the handle section. The soft portion includes a covering section, which covers the distal end part of the core base material section, and a plurality of projections, which extend outward from the covering section.

The above-mentioned interdental cleaning tool is molded through injection molding. In the molding process of the soft portion of the interdental cleaning tool, the core base material portion, which is molded in advance, is placed in a mold, and the elastomer is injected to mold the soft portion through a gate at a position of the mold that is opposed to the distal end of the core base material portion (see FIGS. 11 and 12 of Patent Document 1).

CITATION LIST

Patent Document

Patent Document 1: WO 2013/176297
Patent Document 2: Patent Publication JP-A-2016-87362
Patent Document 3: Patent Publication JP-A-2017-118959

SUMMARY

Technical Problem

However, with the above-mentioned method for manufacturing an interdental cleaning tool, the elastomer is applied in a state of highest injection pressure thereof to the distal end of the core base material portion. At this time, the distal end of the core base material portion sways from side to side. This may result in the elastomer failing to properly coat the core base material portion, causing molding defects of the interdental cleaning tool. In this regard, in the molding method of an interdental cleaning tool disclosed in Patent Document 1, the core base material portion is held from above and below by using holding pins provided in the mold. However, since these holding pins cannot hold the distal end of the core base material portion, it is difficult to sufficiently suppress the distal end of the core base material portion from being laterally swayed.

Furthermore, with the above-mentioned method for manufacturing an interdental cleaning tool, the elastomer is applied at the highest temperature thereof to the distal end of the core base material portion. This may melt the distal end of the core base material portion, causing molding defects of the interdental cleaning tool.

The present invention has been made in view of the above, and it is an objective of the present invention to provide a method for manufacturing an interdental cleaning tool capable of suppressing molding defects of the interdental cleaning tool.

Solution to Problem

A method for manufacturing an interdental cleaning tool according to one aspect of the present invention includes: a first step of injecting a base material into a primary mold to mold a base material portion including a base section and a shaft section extending from the base section; and a second step of injecting a soft material into a secondary mold, in which the base material portion is placed, from a position corresponding to a middle part of the shaft section located further toward the proximal side than a distal end part to mold a soft portion including a covering section that covers the distal end part of the shaft section and a plurality of projections projecting from the covering section, and an extension soft portion that covers the middle part of the shaft section so as to extend the covering section toward the proximal side of the shaft section, the extension soft portion not having the projections. Here, the covering section refers to a section that extends from the distal end to the position of the projection that is the closest to the proximal end and in which the soft portion covers the shaft section. The covering section does not include the extension soft portion.

According to this aspect, to mold the extension soft portion and the soft portion, the soft material is injected into the secondary mold, in which the base material portion is placed, from a position corresponding to the middle part of the shaft section, located further toward the proximal side than the distal end part. As such, the injected high-pressure soft material is not directly applied to the distal end of the shaft section, thus suppressing the distal end of the shaft section from being swayed. Additionally, the high-temperature soft material is not directly applied to the distal end of the shaft section, suppressing the distal end of the shaft section from being molten. Moreover, since the soft material is injected onto the middle part located further toward the proximal side than the distal end part of the shaft section on which the soft portion is molded, the soft material is not directly injected into the region where the projections are molded. As a result, the projections are unlikely to be affected by the injection of the soft material and are thus suitably molded (so-called short shots are suppressed from being created). This suppresses the molding defects of the interdental cleaning tool.

In the second step of the above aspect, the extension soft portion may be molded so as to have a cylindrical shape covering the circumference of the middle part of the shaft section.

In the second step of the above aspect, the extension soft portion may be molded so as to have an outer diameter same as that of the proximal end of the covering section of the soft portion.

In the second step of the above aspect, the extension soft portion may be molded so as to have a length of 3 mm or more in a direction along the shaft section.

Advantageous Effects of Invention

According to the present invention, a method for manufacturing an interdental cleaning tool is provided that is capable of suppressing molding defects of the interdental cleaning tool.

DESCRIPTION OF EMBODIMENTS

Figure 1:
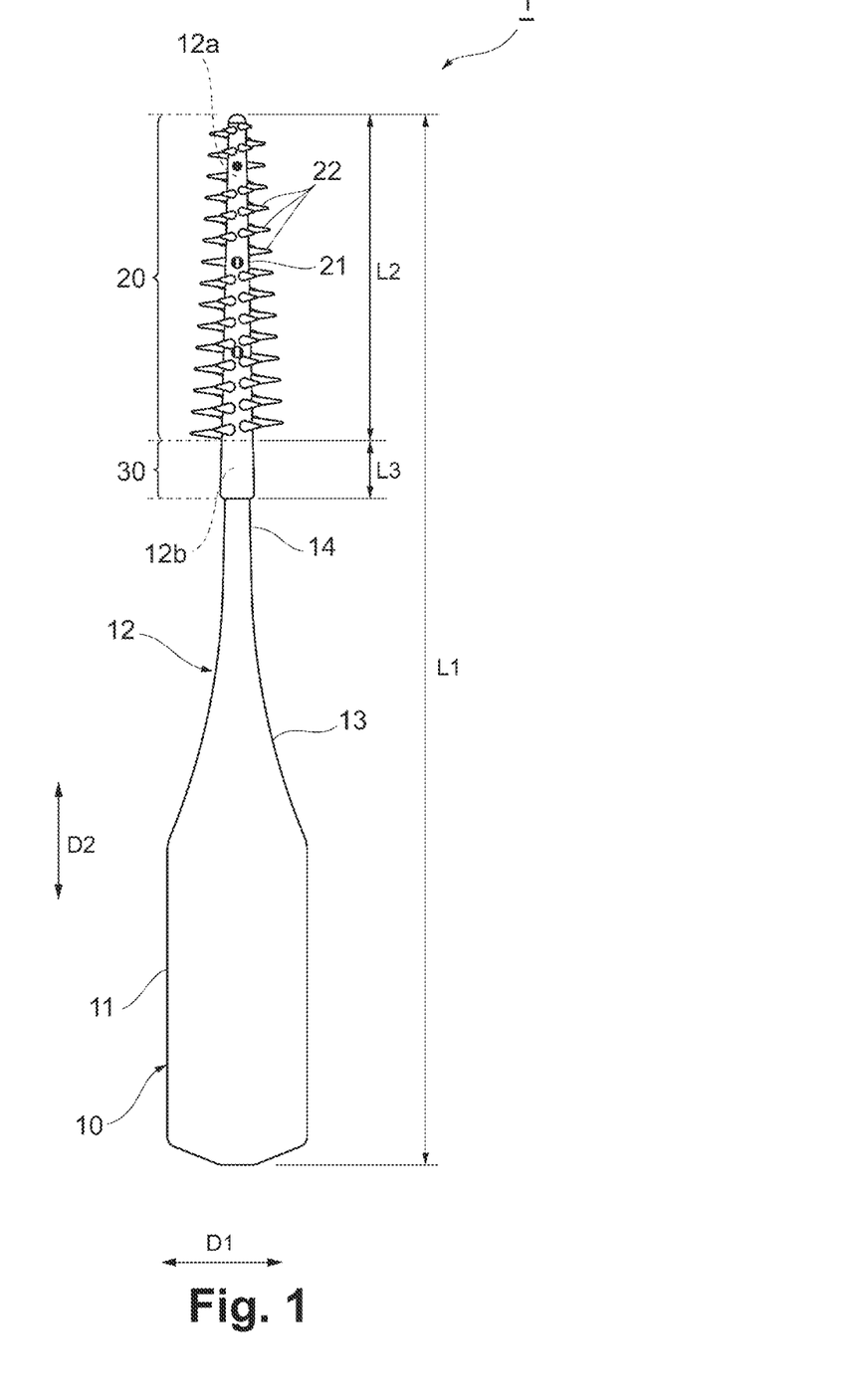
FIG. 1 is a front view schematically showing the configuration of an interdental cleaning tool according to an embodiment of the present invention.
Figure 2:
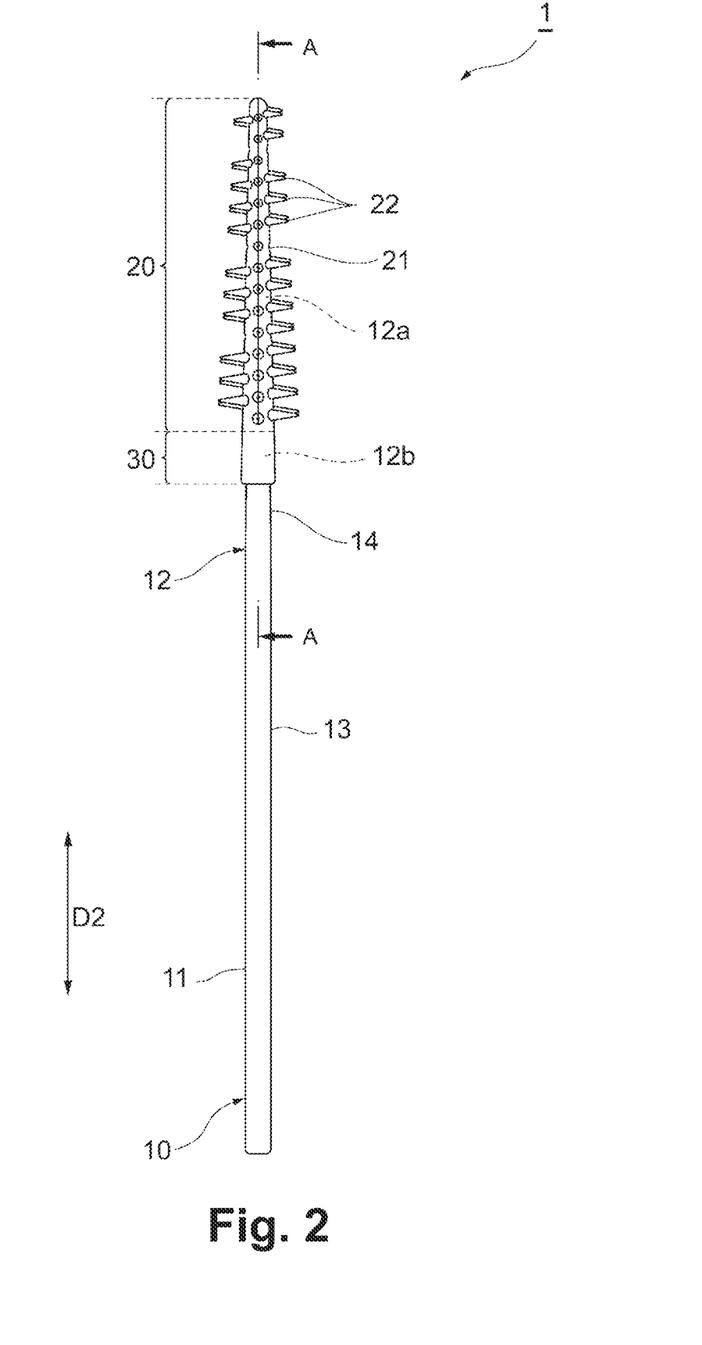
FIG. 2 is a side view schematically showing the configuration of the interdental cleaning tool according to the embodiment of the present invention.

Referring to the drawings, preferred embodiments of the present invention are now described. As shown in FIGS. 1 and 2, an interdental cleaning tool 1 manufactured by a method for manufacturing an interdental cleaning tool according to an embodiment includes a base material portion 10, a soft portion 20, which covers a part of the base material portion 10, and an extension soft portion 30.

The base material portion 10 has a base section 11, which serves as a holding section to be held by a user, and a shaft section 12, which extends from the base section 11 in a longitudinal direction (the up-down direction as viewed in FIG. 1) D2 extending perpendicular to a lateral direction D1 (the right-left direction as viewed in FIG. 1) of the interdental cleaning tool 1 and is to be inserted between teeth of the user. As used herein, the side corresponding to the shaft section 12 relative to the base section 11 (the upper side in the longitudinal direction D2 shown in FIG. 1) is referred to as a distal side, and the side corresponding to the base section 11 relative to the shaft section 12 (the lower side in the longitudinal direction D2 shown in FIG. 1) is referred to as a proximal side.

The base section 11 is formed, for example, in the shape of a flat rectangular plate. There is no limitation to the shape of the base section 11 as long as the user can hold it.

The shaft section 12 includes a transition section 13, which has the shape of a flat plate whose width in a front view decreases toward the distal end of the base material portion 10, and a distal end section 14, which may be cylindrical, for example, and extends linearly from the distal end of the transition section 13 to the distal end of the base material portion 10. For example, the distal end section 14 is shaped such that its diameter gradually decreases from the proximal end to the distal end.

The base material portion 10 is molded from, for example, a synthetic resin material as a base material. Examples of the synthetic resin material include polypropylene, polyethylene, acrylonitrile butadiene styrene (ABS), polybutylene terephthalate, polycarbonate, polyethylene terephthalate, polystyrene, polyacetal, and polyamide. A fiber material such as glass fiber may be added to the synthetic resin material at a proportion of about 1 to 30% by weight.

Figure 3:
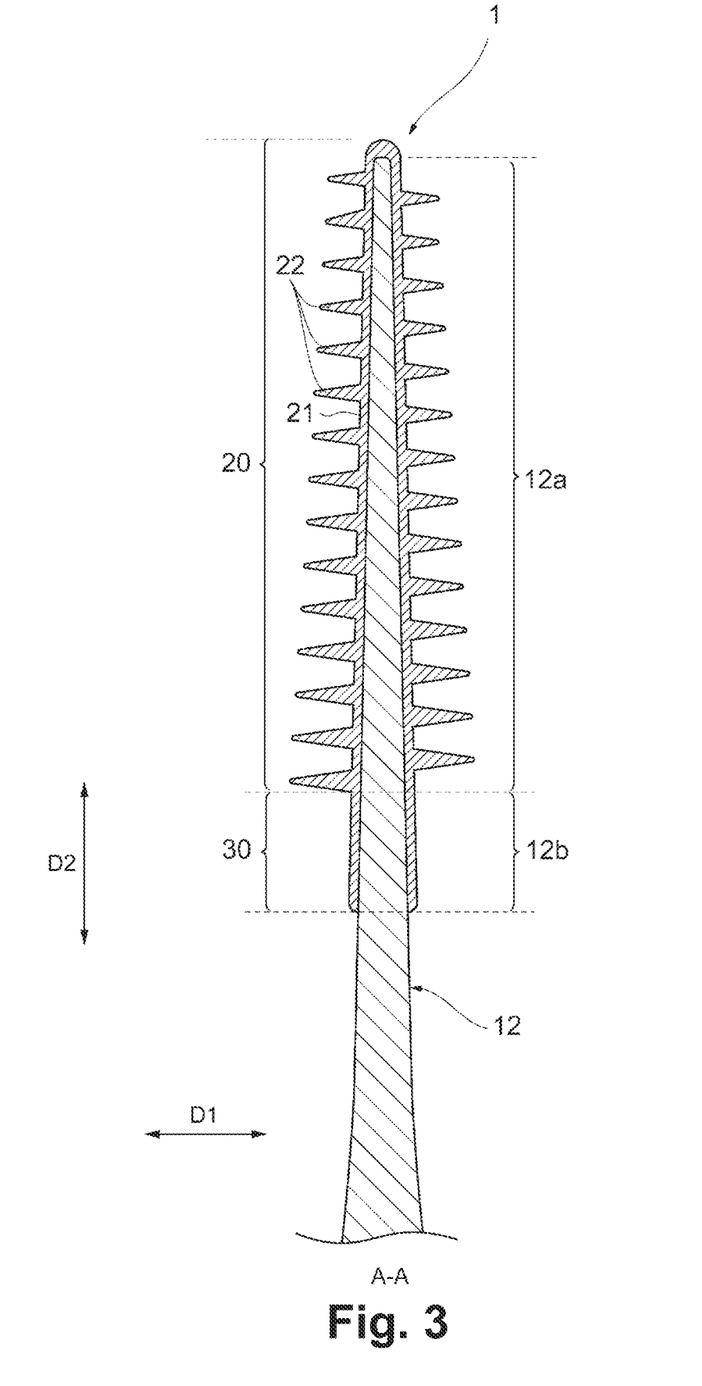
FIG. 3 is a cross-sectional view showing the distal side of the interdental cleaning tool taken along line A-A in FIG. 2.

The soft portion 20 is inserted between teeth of the user and functions as a cleaning portion. As shown in FIGS. 1 to 3, the soft portion 20 includes a covering section 21, which covers the outer circumferential surface of the distal end part 12a of the shaft section 12 from the proximal end to the distal end, and a plurality of projections 22 projecting outward from the covering section 21. The distal end part 12a of the shaft section 12 covered with the covering section 21 may be the same as the distal end section 14, or may be a part of the distal end section 14.

The length L2 of the soft portion 20 shown in FIG. 1 in the longitudinal direction D2 is set to, for example, 4 mm or more and 26 mm or less, preferably 9 mm or more and 21 mm or less, and more preferably 14 mm or more and 16 mm or less. The length L2 of the soft portion 20 may be 8% or more and 80% or less, preferably 15% or more and 65% or less, and more preferably 30% or more and 50% or less of the overall length L1 of the interdental cleaning tool 1 in the longitudinal direction D2, for example. The overall length L1 of the interdental cleaning tool 1 may be set to 45 mm or more and 55 mm or less, for example.

As shown in FIG. 3, the covering section 21 covers the surface of the distal end part 12a of the shaft section 12. The thickness of the covering section 21 is set to, for example, 0.05 mm to 2 mm. In the soft portion 20, the thickness of the covering section 21 gradually increases from the distal end toward the proximal end, and the extension soft portion 30 has a uniform thickness. Each projection 22 is formed in a conical shape, for example. The projections 22 are spirally arranged around the axis of the distal end part 12a of the shaft section 12 from the proximal end to the distal end of the covering section 21. The heights of the projections 22 from the outer circumferential surface of the covering section 21 gradually decrease from the proximal end to the distal end of the covering section 21. The height of each projection 22 may be set to 0.1 mm or more and 5 mm or less, for example.

The extension soft portion 30 shown in FIGS. 1 to 3 is adjacent to the soft portion 20 and closer to the proximal end of the shaft section 12 than the soft portion 20. The extension soft portion 30 covers a middle part 12b of the shaft section 12 located further toward the proximal side than the distal end part 12a so as to extend the covering section 21 toward the proximal end of the shaft section 12. The extension soft portion 30 has a uniform thickness, is cylindrical, covers the outer circumferential surface of the middle part 12b of the shaft section 12, and does not have projections 22 such as those of the soft portion 20. The extension soft portion 30 has the same thickness as the proximal end of the covering section 21 of the soft portion 20, and is smoothly connected to the covering section 21.

The length L3 of the extension soft portion 30 shown in FIG. 1 in the longitudinal direction D2 is set to 3 mm or more, preferably 4 mm or more, more preferably 5 mm or more and 15 mm or less in a direction along the shaft section 12 (longitudinal direction D2). The length L3 of the extension soft portion 30 is set to, for example, 8% or more and 80% or less, preferably 15% or more and 65% or less, and more preferably 30% or more and 50% or less of the length L2 of the soft portion 20. The thickness of the extension soft portion 30 is set to, for example, 0.05 mm to 2 mm, which is the same as that of the covering section 21.

Figure 4:
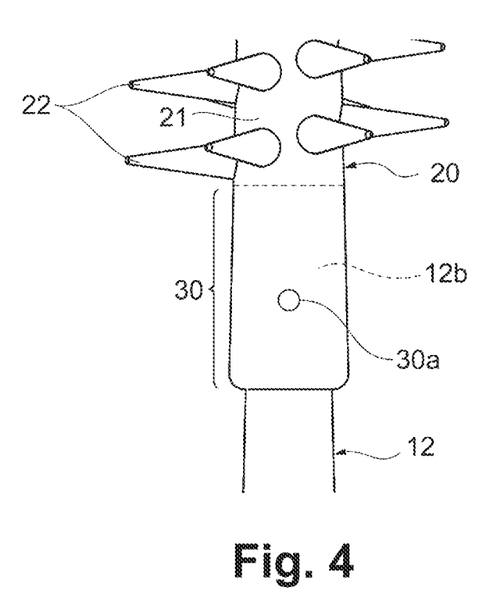
FIG. 4 is a partially enlarged view showing an injection mark of a soft material in an extension soft portion.

As shown in FIG. 4, the extension soft portion 30 has, in its surface, an injection mark 30a at which a soft material has been injected during injection molding. The injection mark 30a is located near the central part of the extension soft portion 30 in the longitudinal direction D2. There is no limitation to the position of the injection mark 30a as long as it is located in the extension soft portion 30.

The soft portion 20 and the extension soft portion 30 are formed of a resin material as a soft material having a lower hardness than the synthetic resin material of the base material portion 10. The resin material may be an elastomer, which may be a styrene-based elastomer, silicone, an olefin-based elastomer, a polyester-based elastomer, or the like. The hardness of the elastomer is preferably 10 to 50 with the durometer hardness type A (JISK6253), and more preferably 10 to 40. In this embodiment, the durometer hardness type A is 35.

Figure 5:
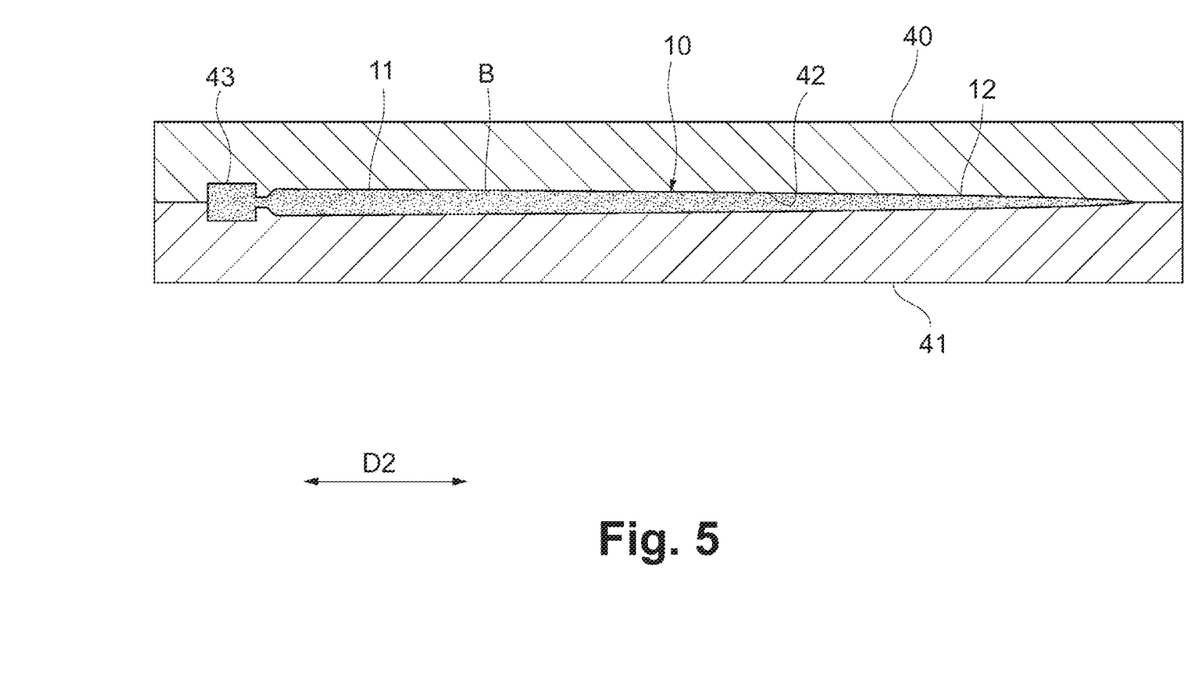
FIG. 5 is a cross-sectional view showing primary molds for forming a base material portion.

A method for manufacturing the interdental cleaning tool 1 is now described. First, as shown in FIG. 5, primary molds 40 and 41 are prepared to mold the base material portion 10. A filling space 42 corresponding to the outer shape of the base material portion 10 is formed in the primary molds 40 and 41. A molten synthetic resin material B as a base material is introduced into the filling space 42 through a gate 43, and the base material portion 10 is molded (the first step). The base material portion 10 is then taken out from the primary molds 40 and 41.

Figure 6:
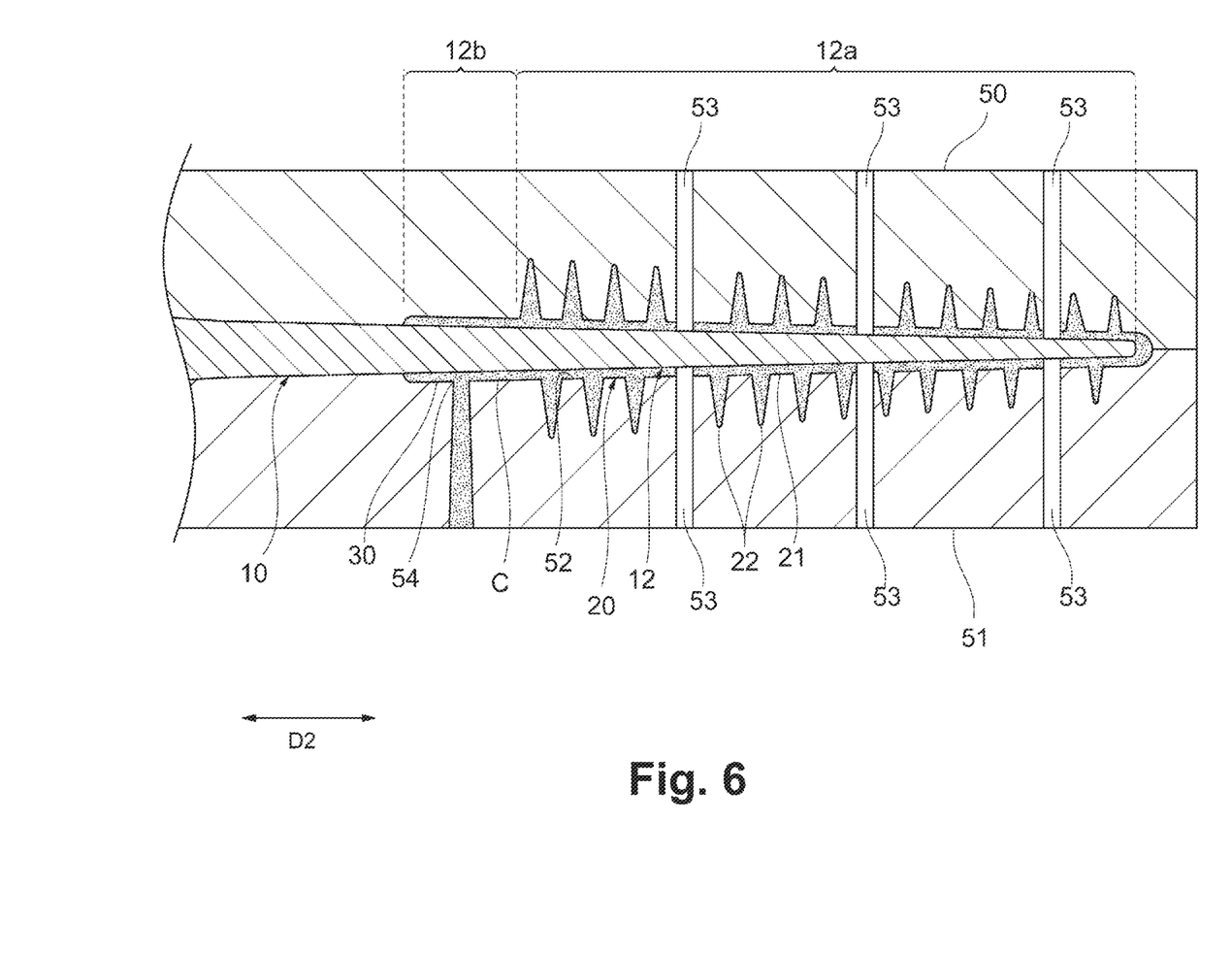
FIG. 6 is a cross-sectional view showing secondary molds for forming a soft portion.

Subsequently, as shown in FIG. 6, secondary molds 50 and 51 are prepared to mold the soft portion 20. A filling space 52 corresponding to the outer shape of the soft portion 20 and the extension soft portion 30 is formed in the secondary molds 50 and 51. The secondary molds 50 and 51 include respective holding pins 53 of a plurality of pairs, which are movable into and out of the filling space 52 in directions perpendicular to the axis of the base material portion 10. Furthermore, the secondary molds 50 and 51 include a gate 54, which is formed in a position corresponding to the middle part 12b of the shaft section 12 of the base material portion 10, which is closer to the proximal end than the distal end part 12a.

The base material portion 10 molded in the first step is placed in the filling space 52 of the secondary molds 50 and 51. The holding pins 53 sandwich and hold the base material portion 10 from the front side and the back side. Then, the filling space 52 of the secondary molds 50 and 51 is filled with a molten elastomer C as a soft material through the gate 54, and the soft portion 20 and the extension soft portion 30 are molded (the second step). The interdental cleaning tool 1 is thus molded. The interdental cleaning tool 1 is then taken out from the secondary molds 50 and 51.

Figure 7:
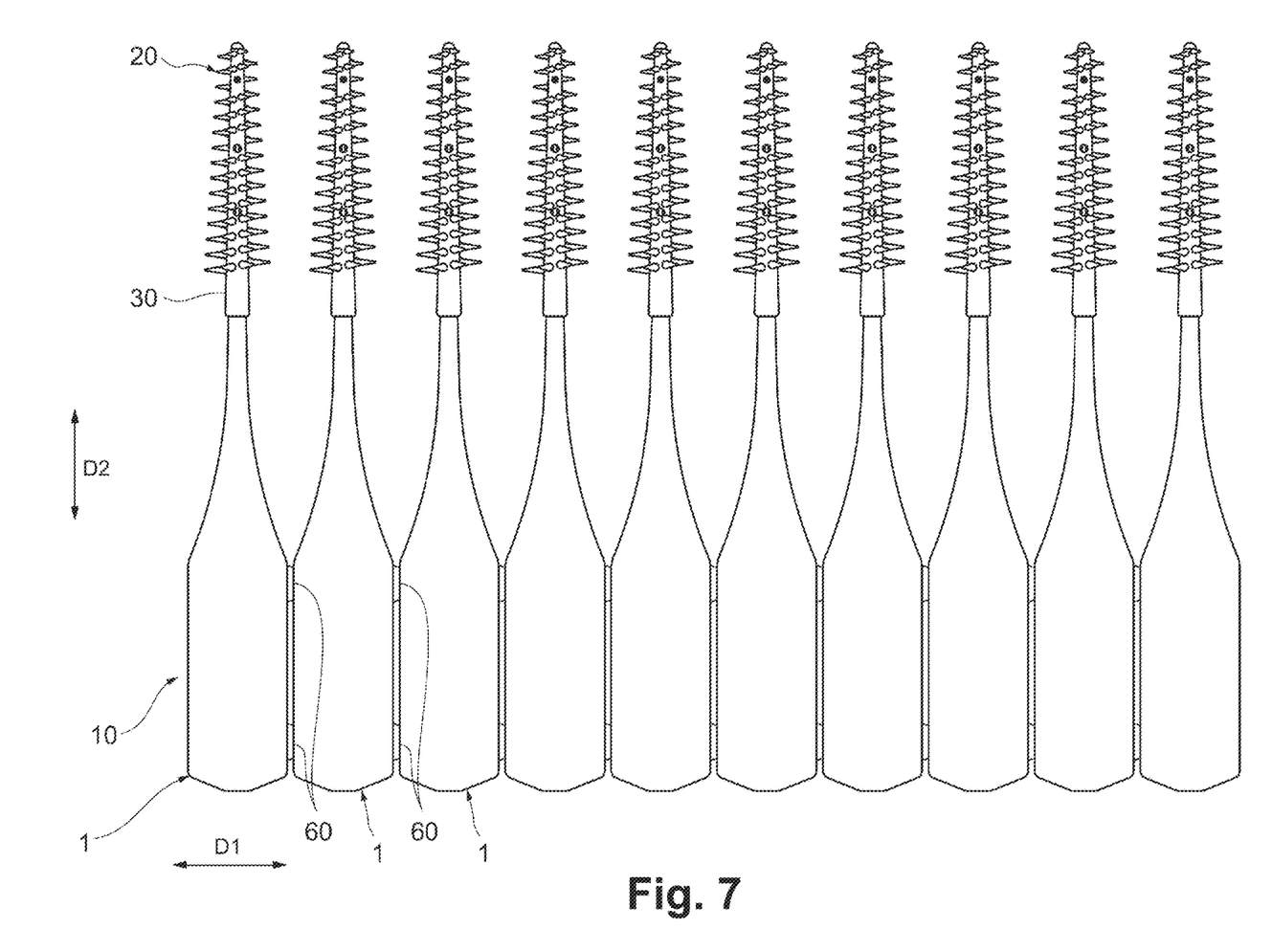
FIG. 7 is a front view showing a connected member including a plurality of interdental cleaning tools.

In the present embodiment, the configuration and manufacturing method of the interdental cleaning tool are described focusing on the single interdental cleaning tool 1, but the interdental cleaning tool 1 is one of a plurality of interdental cleaning tools that are molded as a connected member in which the interdental cleaning tools 1 are connected side by side in the lateral direction D1 by connecting sections 60 formed in the base material portions 10 as shown in FIG. 7, for example. The interdental cleaning tool 1 has been separated from the connected member as a single piece.

According to the present embodiment, to mold the extension soft portion 30 and the soft portion 20, the elastomer C is injected into the secondary molds 50 and 51 in which the base material portion 10 is placed through the gate 54 located at a position corresponding to the middle part 12b, which is located further toward the proximal side than the distal end part 12a of the shaft section 12. As such, the injected high-pressure elastomer C is not directly applied to the distal end of the shaft section 12, suppressing the distal end of the shaft section 12 from being swayed. Additionally, the high-temperature elastomer C is not directly applied to the distal end of the shaft section 12, suppressing of the distal end of the shaft section 12 from being molten. Moreover, since the elastomer C is injected onto the middle part 12b located further toward the proximal side than the distal end part 12a of the shaft section 12 in which the projections 22 are molded, the elastomer C is not directly injected into the region where the projections 22 are molded. As a result, the projections 22 can be suitably molded without being affected by the injection of the elastomer C. This suppresses the molding defects of the interdental cleaning tool 1. Furthermore, the distance between the gate 54 and the distal end of the molded member (the distal end of the soft portion 20) is relatively short, thereby suppressing the occurrence of molding defects.

With an interdental cleaning tool, stress tends to be concentrated at the starting point of the soft portion, which typically corresponds to the end of the projections, thereby increasing the likelihood of breaking at the starting point of the soft portion. According to the present aspect, the interdental cleaning tool 1 includes the extension soft portion 30, which covers the middle part 12b of the shaft section 12 on the proximal side of the soft portion 20 and is free of the projections. Consequently, the stress applied to the interdental cleaning tool during use is dispersed. This allows for the manufacturing of the interdental cleaning tool 1 with high strength.

The extension soft portion 30 has a cylindrical shape covering the circumference of the middle part 12b of the shaft section 12. This reduces the resistance when injecting the elastomer C, allowing the elastomer C to be poured into the secondary molds 50 and 51 in a suitable manner. The pressure applied during the injection of elastomer C is uniform in all directions, so that the soft portion 20 and the extension soft portion 30 are molded with a constant pressure from the proximal end to the distal end. This allows the soft portion 20 and the extension soft portion 30 to have a thickness that conforms to the molds. As a result, dimensional variations are reduced between products of the interdental cleaning tools 1. Furthermore, the cylindrical extension soft portion 30 allows the secondary molds 50 and 51 to have a simple structure. As such, the processing of the secondary molds 50 and 51 is relatively easy, reducing the manufacturing cost.

The extension soft portion 30 may be formed so as to have the same outer diameter as the proximal end of the covering section 21 of the soft portion 20 including the projections. The extension soft portion 30 having a uniform outer diameter facilitates the processing of the secondary molds 50 and 51, reducing the manufacturing cost.

In the second step, the extension soft portion 30 is molded so as to have a length of 3 mm or more in a direction along the shaft section 12. The extension soft portion 30 is therefore sufficiently long, so that the stress applied to the interdental cleaning tool 1 during use can be sufficiently dispersed. This allows for the manufacturing of the interdental cleaning tool 1 with high strength.

The embodiments described above are intended to facilitate the understanding of the invention and are not intended to limit the interpretation of the present invention. The element of the embodiments, as well as their arrangements, materials, conditions, shapes, sizes, and the like are not limited to those illustrated and may be modified as appropriate. Additionally, the configurations shown in different embodiments can be partially replaced or combined.

For example, the shape of the interdental cleaning tool 1 is not limited to that of the above embodiments. For example, the shaft section 12 is formed linearly in the embodiments, but may be curved in an arc shape. The second step does not necessarily have to mold the cylindrical extension soft portion 30 as the above embodiments, as long as the soft portion 20 is molded by injecting an elastomer onto the middle part 12b of the shaft section 12 that is located further toward the proximal side than the distal end part 12a.

INDUSTRIAL APPLICABILITY

The present invention effectively provides a method for manufacturing an interdental cleaning tool capable of suppressing molding defects of the interdental cleaning tool.

REFERENCE SIGNS LIST

1 Interdental cleaning tool
10 Base material portion
11 Base section
12 Shaft section
12a Distal end part of shaft section
12b Middle part of shaft section
20 Soft portion
21 Covering section
22 Projection
30 Extension soft portion
40, 41 Primary mold
50, 51 Secondary mold
54 Gate

What is claimed is:

1. A method for manufacturing an interdental cleaning tool, the method comprising:
   a first step of injecting a base material into a primary mold to mold a base material portion including a base section and a shaft section extending from the base section; and
   a second step of injecting a soft material into a secondary mold, in which the base material portion is placed, from a position corresponding to a middle part of the shaft section located further toward a proximal side than a distal end part to mold a soft portion including a covering section that covers the distal end part of the shaft section and a plurality of projections projecting from the covering section, and an extension soft portion that covers the middle part of the shaft section so as to extend the covering section toward a proximal side of the shaft section, the extension soft portion not having the projections
   wherein a gate is arranged at a position in an area where the extension soft portion is molded in the second step, the position corresponding to the middle part of the shaft section, and the soft material is injected from the gate.

2. The method for manufacturing an interdental cleaning tool according to claim 1, wherein in the second step, the extension soft portion is molded so as to have a cylindrical shape covering a circumference of the middle part of the shaft section.

3. The method for manufacturing an interdental cleaning tool according to claim 1, wherein in the second step, the extension soft portion is formed so as to have an outer diameter same as that of a proximal end of the covering section of the soft portion.

4. The method for manufacturing an interdental cleaning tool according to claim 1, wherein in the second step, the extension soft portion is molded so as to have a length of 3 mm or more in a direction along the shaft section.

* * * * *